United States Patent [19]
Going et al.

[11] Patent Number: 5,495,641
[45] Date of Patent: Mar. 5, 1996

[54] KNOB TURNING DEVICE AND METHOD

[76] Inventors: Patrick E. Going, 6545 White Falcon Ct., Colorado Springs, Colo. 80918; William R. Youmans, 7235 S. Steele Cir., Colorado Springs, Colo. 80920

[21] Appl. No.: 224,233

[22] Filed: Apr. 8, 1994

[51] Int. Cl.⁶ .................................................... E05B 1/04
[52] U.S. Cl. ................................................................ 16/121
[58] Field of Search ................................ 16/121, 114 R, 16/116 R, 118, DIG. 12; 292/336.3, 347, 348, DIG. 2; D8/322; D25/122

[56] References Cited

U.S. PATENT DOCUMENTS

| | | | |
|---|---|---|---|
| D. 211,398 | 6/1968 | Hall | D8/322 |
| D. 329,590 | 9/1992 | Chapman | D8/322 |
| 2,721,597 | 10/1955 | Pitrella | 292/DIG. 2 |
| 2,731,056 | 1/1956 | Anson | 292/DIG. 2 |
| 4,094,210 | 6/1978 | Wirtz et al. | 16/121 |
| 4,504,087 | 3/1985 | Pennington | 292/DIG. 2 |
| 4,971,375 | 11/1990 | Grecco | 16/114 R |
| 4,999,875 | 3/1991 | Rybak | 16/116 R |
| 5,008,551 | 4/1991 | Randolph | 250/462.1 |

OTHER PUBLICATIONS

Sammons Catalog, "Door Knob Extensions", 1994, p. 37.

Primary Examiner—P. Austin Bradley
Assistant Examiner—Chuck Y. Mah
Attorney, Agent, or Firm—Linda Flewellen Gould

[57] ABSTRACT

A method of turning typical doorknobs and other knobs without having to grasp the knob enables persons with hand debilities to open doors. The method involves installation of a knob cover which is round and made of a resilient material which can be slipped over the knob without tools, and will snugly remain around the knob. Multiple levers protrude from the knob cover, so that pushing any of the levers will cause the knob to be turned. Each lever is substantially U-shaped with a rounded apex, to avoid discomfort which might be caused by pointed levers. Furthermore, each lever is made of a resilient, soft material to facilitate movement of the levers by sensitive hands. Each lever extends from the cover a sufficient distance to allow a closed fist to engage and push the lever, while each lever is short enough to avoid contact with a door jam or adjacent wall when the knob cover is installed on a doorknob.

9 Claims, 4 Drawing Sheets

KNOB TURNING DEVICE AND METHOD

BACKGROUND OF THE INVENTION

1. Technical Field

This invention pertains to a method for turning a doorknob or other type of knob and a device which surrounds a typical doorknob or other knob to enable the knob to be turned without grasping the knob.

2. Background Art

A typical doorknob is round or oval so that the knob can be grasped by one hand and turned. As the doorknob is turned on a door in a closed position, a striker is moved through a striker plate into a recess in the door. The movement of the striker in response to the doorknob being turned moves the striker out of a hole formed in a door frame or jam. As a result, the door is freed from the door jam so that the door may be swung open.

Although turning a typical doorknob is a simple task for many people, a variety of disabilities may render the task painful or impossible. For example, people suffering from arthritis in hand joints may be unable to grasp a doorknob tightly enough to turn the knob, without incurring significant pain. Similarly, a person who is unable to open his fingers from a closed position, or who has had a hand amputated, is unable to grasp a typical doorknob and turn the knob. Such a disability could adversely affect a person's ability to rotate other types of knobs as well, such as water faucet knobs and shower control knobs.

Recognizing the difficulties in access which result from such disabilities, the Americans with Disabilities Act Accessibility Guidelines (ADAAG) recommend that public accommodations avoid access barriers by making door handles operable with a closed fist. This standard requires that door hardware be operable without any tight grasping or twisting motion. In new construction, this requirement is frequently satisfied by installing a single lever door opener, push-type mechanism, or U-shaped handle. Such door openers are typically significantly more expensive than standard round doorknobs. Furthermore, property owners are frequently reluctant to replace existing round doorknobs which are currently functioning well for people without disabilities with expensive specialized door openers. As a result, the barrier free goals of the ADAAG are resisted by property owners who prefer less expensive standard doorknobs.

The Americans with Disabilities Act (ADA) clearly states in Title III "Public Accommodations" that physical barriers in existing buildings must be removed if such removal is "readily achievable". In addition, Title II of the ADA, "Public Entities", states that state and local governmental entities must remove all physical barriers as defined in the ADAAG that prevent access to their programs and services. For example, the federal District Court for the District of Colorado has recently mandated in Civil Action No. 93-C-1857 that the General Assembly of the State of Colorado either keep doors open or install devices which enable doorknobs to be turned by persons with difficulty grasping a standard doorknob. An economic way to meet such ADA requirements in both the private and public sector is needed.

A number of doorknob covers are known in the prior art to enable existing round doorknobs to be turned by people with hand disabilities. For example, the Sammons 1994 catalog advertises four types of doorknob extensions, each of which comprises a single lever which can be attached to a round doorknob. Each of these knob extenders is useful for its intended purpose. Nevertheless, some disadvantages of each of these extenders are apparent. Two of the doorknob extensions advertised in Sammons require tools for installation, and will only fit a round doorknob of a particular size. A portable turner is shown which can be slipped over a doorknob without tools, but is intended to be carried from one doorknob to the next. It would be considerably more convenient for someone with a hand disability to be able to turn doorknobs without carrying such a portable device from room to room. Furthermore, the portable turner has a four and a half inch handle, which extends past the edge of the door, so that the door jam or an adjacent wall may interfere with moving the portable handle to turn the knob.

A rubber door knob extension marketed in the Sammons catalog effectively enables someone with a hand disability to turn an existing round doorknob. The rubber extension has the advantage of snapping over an existing doorknob without requiring tools for installation. However, installation is complicated by the fact that the single lever must be aligned to prevent the handle from being interfered with by an adjacent door jam or wall. Furthermore, the hard rubber construction may make it difficult to install this type of extension on doorknobs of a variety of shapes and sizes.

Single lever doorknob extensions sometimes have the adverse effect of creating excessive stress on the internal mechanisms of doorknobs operated by those extensions. To avoid such stress and an eventual need to replace the doorknob, the applicants herein have developed a ribbed soft door grip which is also advertised in the Sammons catalog, and is sold under the trademark "Knobbles". Although Knobbles enable a person suffering from arthritis to more easily turn a round doorknob, Knobbles are not as effective as a lever door opener for someone with a closed fist.

Other types of doorknob covers are known in the prior art. U.S. Pat. No. 5,008,551 to Randolph teaches a luminous door knobs cover which enables a doorknob to be seen in a dark room. The Randolph cover does not facilitate turning the knob, which must be grasped and twisted to the same extent as if the doorknob cover was not used. A spiked doorknob was manufactured several years ago by Crump Products, Inc. of Louisville, Ky. This product was inherently stiff and difficult to stretch. Consequently, it would fit a very limited number of doorknobs. Although the pointed spikes did result in a person not having to grasp the doorknob as tightly as a non-covered doorknob to twist the knob, the spikes were also uncomfortable to grasp, particularly for a person with sensitive hands resulting from a disability such as arthritis.

A method of converting a variety of existing door knobs so that such knobs can be operated by persons with hand disabilities is needed. Ideally, such a method would be inexpensive so that it would be economically feasible to enable existing door knobs to be operated by such disabled persons. Furthermore, such a method should advantageously be easily installed.

SUMMARY OF THE INVENTION

An object of this invention is to provide a method of turning an existing doorknob, shower control knob, round water faucet handle, or other round valve handle such as found on propane tanks, without grasping the knob or round handle, so that a person with hand disabilities can effectively operate the knob or handle.

Another object of this invention is to provide a device to facilitate turning a typical knob without grasping the knob, which device is easy and economical to install.

The method of turning an existing knob according to the present invention involves covering the knob with a resilient, soft cover with multiple levers protruding from the cover. Each lever is also made of a soft material, so that the lever can be pushed by sensitive hands without causing discomfort. Each lever extends a distance which permits the lever to be engaged and pushed by a closed fist. To most advantageouly facilitate rotating a doorknob, the levers extend no further than the distance between the knob cover and the edge of the door, to avoid contact between the levers and the door jam or an adjacent wall. To satisfy these parameters, a lever of no more than 4 centimeters and no less than 1.5 centimeters is particularly beneficial.

The knob cover is made of a resilient material which can be stretched to fit onto any standard doorknob, of a variety of shapes and sizes. After being simply installed by pulling the cover around the doorknob, the cover attempts to resume its original round shape, thus snugly fitting against the doorknob. When the cover surrounds the doorknob, movement of the cover effectively moves the doorknob.

Each lever may advantageously be formed substantially in a U-shape, including two prongs and an apex. The apex is rounded to avoid discomfort associated with touching pointed levers. One end of each prong extends from and is attached to the apex, while the other end of each prong attaches to the exterior of the round cover. The U-shaped levers may be hollow, which results in said levers being more resilient and more comfortable to push. Alternatively, the U-shaped levers may be filled with a soft material, to provide more rigidity in each lever.

An embodiment of the knob cover which includes three levers, evenly spaced around the exterior of the cover, is particularly advantageous. Such a cover may be installed on any typical doorknob, without having to align the levers in a particular manner, as would be prudent for a single lever mechanism. Nevertheless, the space between each of the adjacent levers is sufficiently large to allow a closed fist or prosthesis to engage any of the levers and push the lever to effectively turn the doorknob.

Ridges may be formed on or attached to the exterior of the knob cover, to add structural strength and to facilitate pushing against the cover. Such ridges should protrude from the cover a short distance compared to the length of each lever, to avoid interfering with engagement of the levers by a closed fist.

Manufacture of such a knob cover is extremely economical compared to metal hardware. Furthermore, equipping an existing doorknob with such a cover is considerably less expensive than replacing the existing knob with a mechanism that :meets ADAAG standards. The described knob cover can be installed without the use of tools, in less than a minute, on a variety of shapes and sizes of doorknobs. Once installed, each lever may be easily pushed, even by someone with a hand disability, to turn the doorknob. Similarly, the knob cover could be easily placed onto other types of knobs such as shower control knobs or propane tank knobs, to enable a person with a hand disability to rotate such knobs.

The novel features that are considered characteristic of the invention are set forth with particularity in the claims. The invention itself, both as to its construction and its method of operation, together with additional objects and advantages thereof, will best be understood from the description of specific embodiments which follows, when read in conjunction with the accompanying drawings.

DETAILED DESCRIPTION OF THE PREFERRED EMBODIMENT

The present invention involves a method of turning a typical doorknob or other knob without grasping the knob. Such a method is particularly useful for a person suffering from one of numerous hand disabilities which render it difficult or painful to grasp or twist a standard doorknob.

In the following description, numerous specific details are set forth, in order to provide a thorough understanding of the present invention. It will be obvious, however, to one skilled in the art that the present invention may be practiced without these specific details. Some well-known methods and structure have not been set forth in order not to unnecessarily obscure the description of the present invention.

Figure 1:
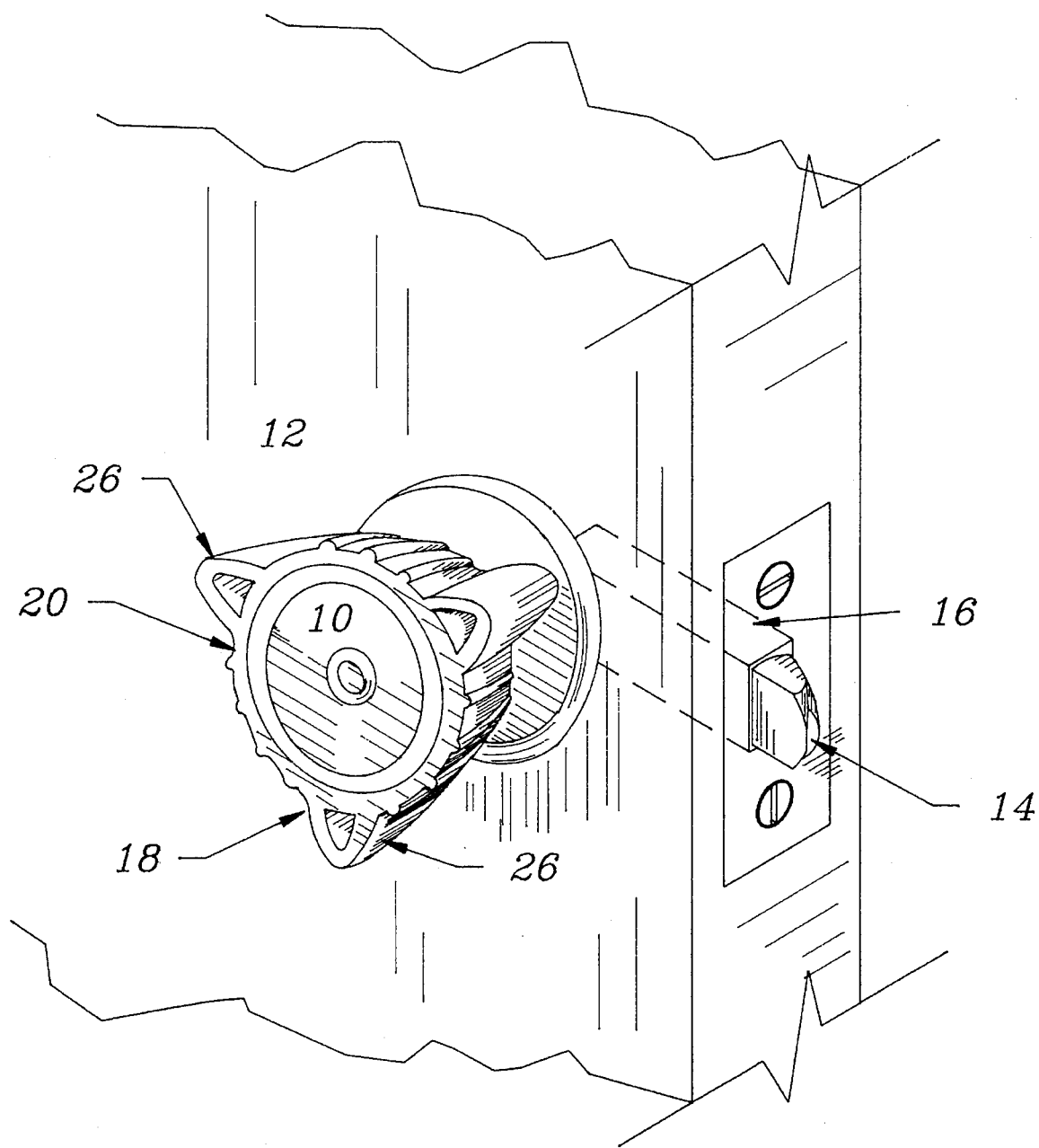
FIG. 1 is perspective view of a device for turning a knob, installed on a doorknob, according to the present invention.

The method of turning a knob of the present invention can be better understood by reference to FIG. 1. A doorknob 10 and associated mechanisms are installed in a door 12. When the door 12 is closed, a striker 14 extends from the doorknob 10 through a recess 16 in the door 12 into a hole formed in the door jam (not shown). To release the door 12 from the door jam, the doorknob 10 is turned, moving the striker 14 out of the hole in the door jam (not shown) into recess 16 in the door 12. In this manner, the door 12 is freed from the door jam (not shown) so that the door may be pushed open.

A typical round doorknob 10 can be turned to effectuate movement of the striker 14 only by grasping the doorknob 10. While this is a simple task for most people, those with various hand debilities may find grasping a doorknob 10 to be difficult or painful. To ensure that people with such disabilities are not prevented access from rooms and buildings equipped with standard doorknobs, an economical and easily installed device 18 for turning doorknobs 10 is needed, which does not require grasping the doorknob 10 to operate.

A turning device 18 comprises a knob cover 20 and multiple levers 26. The knob cover 20 with an interior 22 and an exterior 24 may beneficially be formed in a substantially round shape, so that the interior 22 of the cover 20 snugly fits around a standard doorknob 10. Ideally the cover 20 should be made of a resilient material which can be stretched around a variety of sizes of doorknobs 10 or other types of knobs for installation, but conforms to the doorknob 10 to snugly surround the doorknob 10. This resilient material should be relatively soft to avoid irritating hands which are made sensitive from a disability such as arthritis. A polymer such as Kraton G 7705-1, or Kraton 2706 mixed with an ultraviolet light stabilizer, presently manufactured by Shell Oil, has be, en found to meet these parameters.

Figure 2:
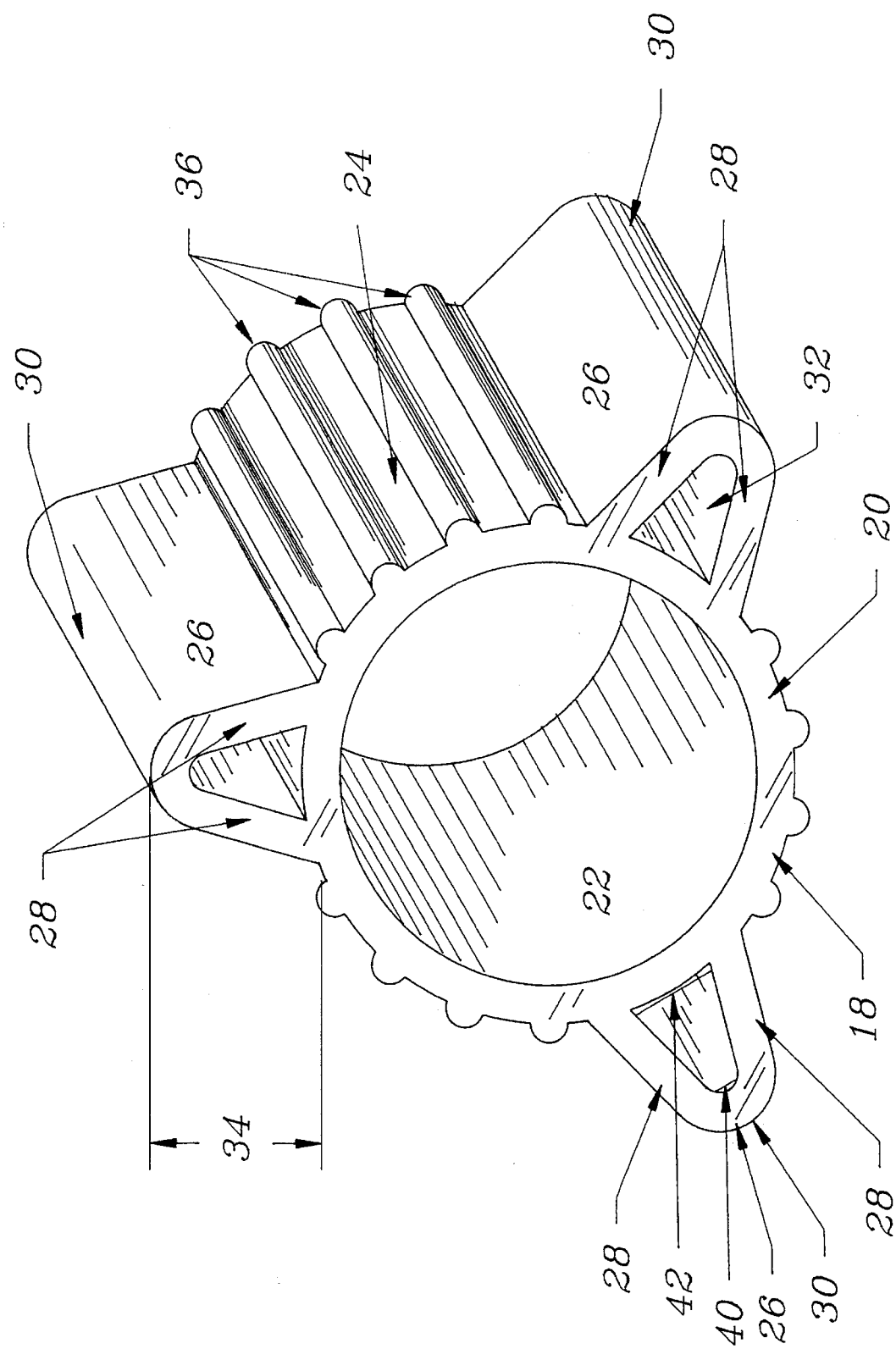
FIG. 2 is a front view of a knob turning device according to the present invention.

As shown in FIG. 2, a knob cover 20 suitable for facilitating doorknob turning without grasping the doorknob 10 has multiple levers 26 protruding from the exterior 24 of the cover 20. Each lever 26 is ideally made of a soft material which can be easily pushed by sensitive hands. The turning mechanism 18 can be most economically produced when the knob cover 20 and levers 26 are made from the same material, such as the Kraton polymers listed above.

Figure 4:
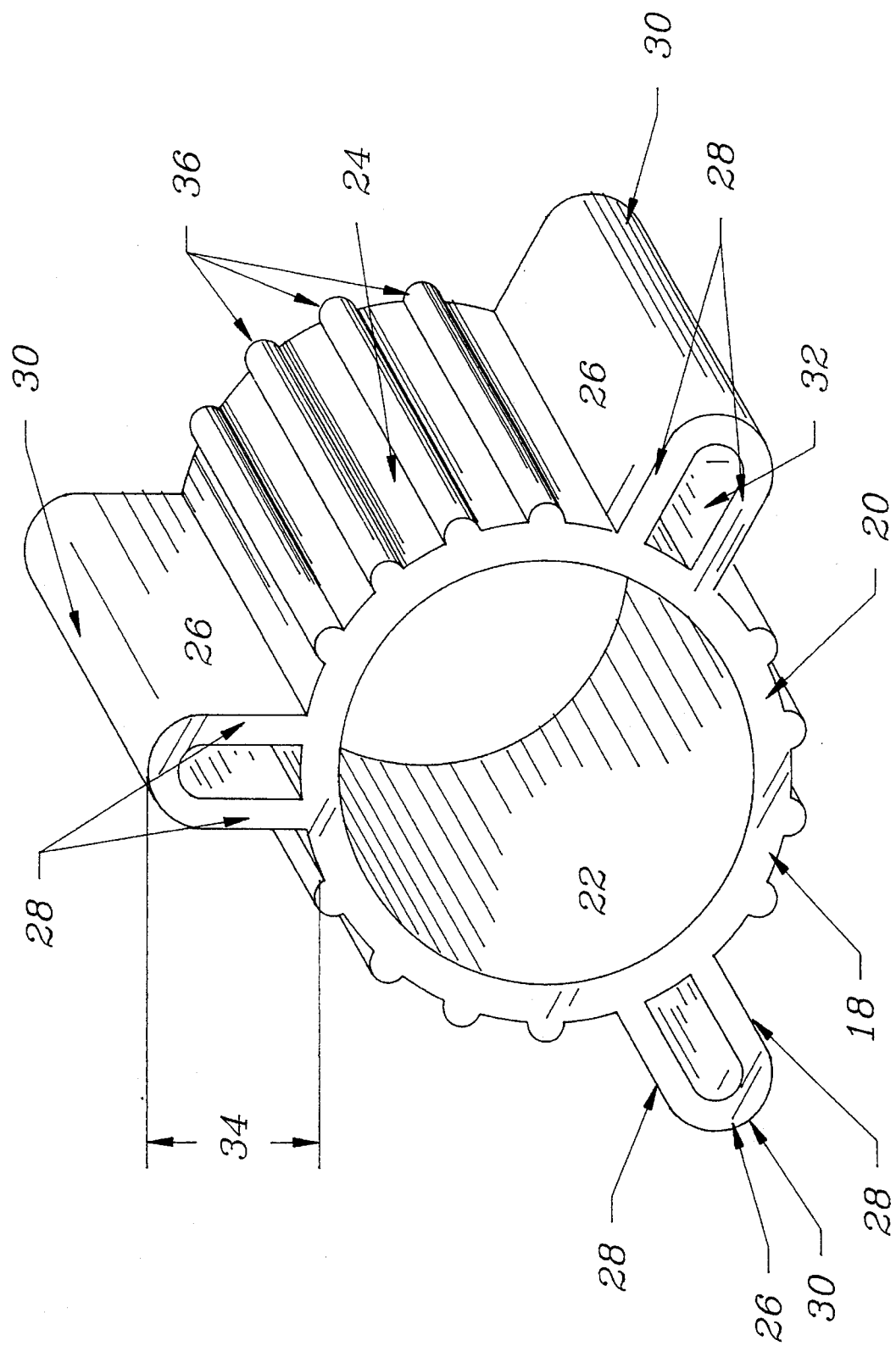
FIG. 4 is a front view of another version of a knob turning device according to the present invention.

Each lever 26 may be formed substantially in a U-shape, with two prongs 28 and an apex 30. The apex 30 of each lever 26 can beneficially be rounded so that no sharp points threaten to cause discomfort to sensitive hands. Various shapes and sizes of levers 26 are possible, although it may be advantageous and most aesthetically pleasing to use levers 26 of uniform size and shape on a particular turning mechanism 18. For example, the U-shaped lever 26 may have prongs 28 which are substantially parallel to each other, as shown in FIG. 4 or which move away from each other as the prongs 28 extend from the apex 30 to the exterior 24 of the cover 20. As shown in FIG. 2, the prongs 28 of the U-shaped lever 26 may be separated from each other by a first predetermined distance 40 adjacent to the apex 30, and separated from each other by a second predetermined distance 42 adjacent to the cover 20, with the first predetermined distance 40 being smaller than the second predetermined distance 42.

The space 32 which is defined and surrounded by two prongs 28 of a single lever 26 and the portion of the cover exterior 24 between said prongs 28 may be hollow or filled with a resilient material. If space 32 is hollow, the levers 26 are more cushioned, and softer to touch. If more rigidity of levers 26 is desired, it may be appropriate to fill space 32 with a material such as the material from which the levers 26 are made.

As shown in FIG. 2, the distance 34 between the apex 30 of a lever 26 and the exterior 24 of the cover 20 is critical to proper functioning of the device 18. Distance 34 should be short enough that the lever 26 does not contact a door jam (not shown) when the door 10 is near the door jam. Thus, distance 34 should ideally be no more than 4 centimeters to avoid interference caused by the lever 26 extending beyond the edge of the door 10. Furthermore, levers of a greater length 34 would cause stress to the internal doorknob mechanisms if consistently used to turn the doorknob 10. Therefore, it is advantageous to limit the distance 34 to minimize stress caused by using the lever 26. At the same time, lever 26 should protrude from the cover 20 a sufficient distance 34 to enable a closed fist (not shown) to push against the lever 26 without slipping off of the lever 26. A distance 34 of at least 1.5 centimeters is beneficial to achieve this goal.

Multiple levers 26 enable the doorknob 10 to be turned by simply pushing against whichever lever 26 is most convenient to reach. However, if an abundance of levers 26 protrude from the cover 20, it will be difficult for a person with a closed fist to maneuver that fist between adjacent levers 26, due to the short distance along the cover exterior 24 between adjacent levers 26. Therefore, it has been found most advantageous to have two, three, four, or five levers 26 on a single mechanism 18. An embodiment of the turning mechanism 18 which consists of a cover 20 and three levers 26 spaced evenly around the cover 20 has proven to be particularly convenient, while readily usable by someone with a closed fist.

Ridges 36 may be formed on the cover exterior 24 to add structural strength to the cover 20. Such ridges 36 need to be short enough not to interfere with pushing the levers 26 by a closed fist. Such ridges 36 may have the added advantage of making it easier to grasp the knob cover 20.

Figure 3:
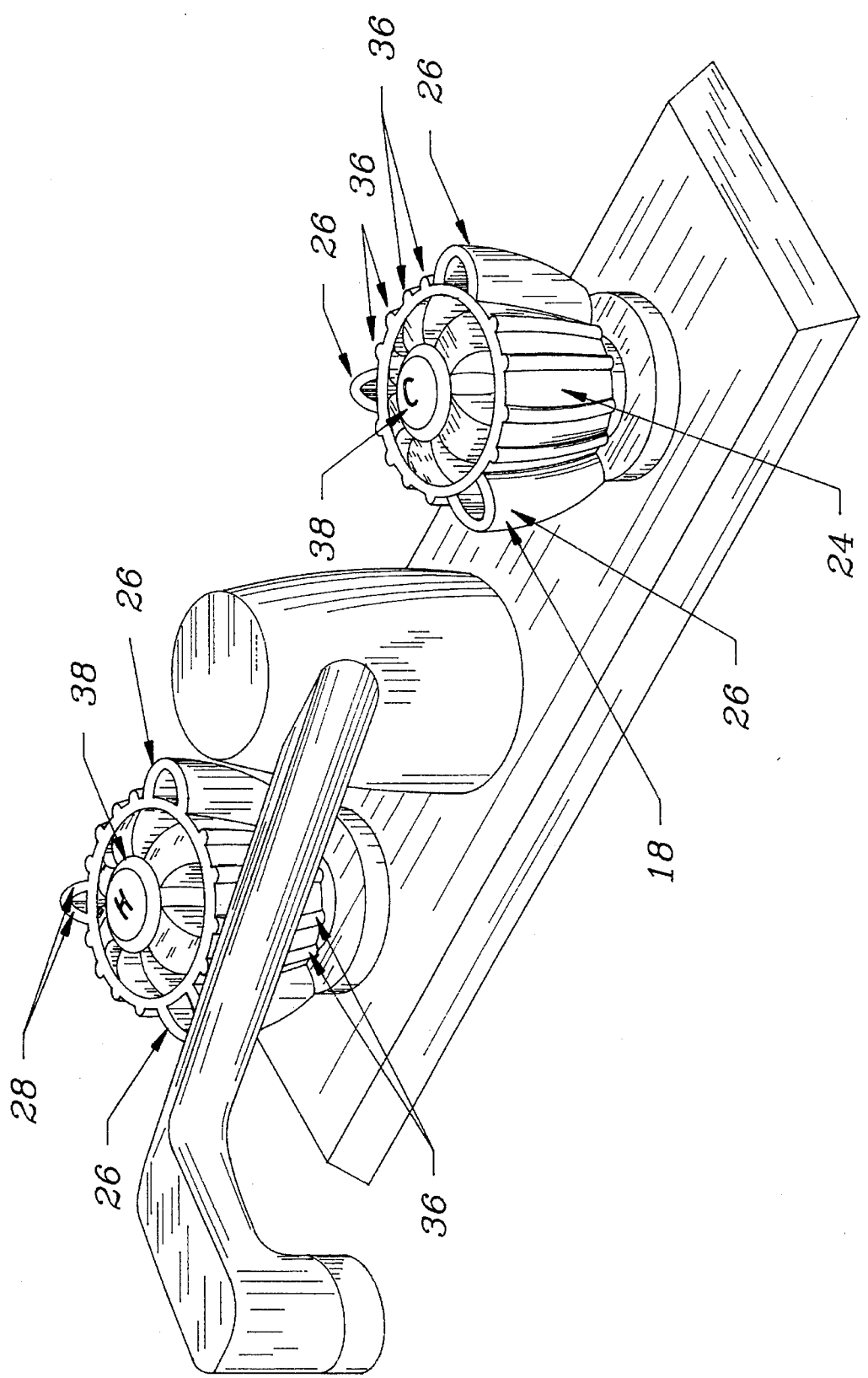
FIG. 3 is a perspective view of a knob turning device according; to the present invention, shown installed on a water faucet knob.

As shown in FIG. 3, the turning mechanism 18 may be used to facilitate turning a variety of types of knobs or round controls, such as a water faucet handle 38.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

We claim:

1. A device for turning a knob, comprising:
   a. a substantially round cover with an interior and an exterior, suitable for snugly surrounding the knob when said interior is placed in contact with the knob, and
   b. a plurality of resilient levers protruding from the exterior of said cover,
   c. wherein each resilient lever further comprises two, prongs extending toward said cover from a rounded apex, each of which prongs surrounds a U-shaped air space, each of which prongs is attached at one end to the rounded apex and at the other end to the exterior of said cover.

2. A device as described in claim 1, wherein said U-shaped air space is hollow.

3. A device as described in claim 1, wherein said U-shaped air space is filled with a resilient material.

4. A device as described in claim 1, wherein the prongs of each lever are substantially parallel to each other.

5. A device as described in claim 1, wherein the prongs of each lever are separated by a first predetermined distance adjacent to the apex, and a second predetermined distance adjacent to the cover, and said first predetermined distance is smaller than said second predetermined distance.

6. A device as described in claim 1, wherein a fixed predetermined distance separates each lever from each adjacent lever.

7. A device as described in claim 6, wherein there are three resilient levers.

8. A device as described in claim 1, further comprising a plurality of ridges attached to said exterior of said cover.

9. A method for turning a knob, comprising the steps of:
   a. placing around the knob a substantially round cover with an interior and an exterior, suitable for snugly surrounding the knob, said cover having a plurality of resilient levers protruding from the exterior of said cover, wherein each resilient lever further comprises two prongs extending toward said cover from a rounded apex, each of which prongs surrounds a U-shaped air space, each of which prongs is attached at one end to the rounded apex and at the other end to the exterior of said cover, and
   b. pushing one of said resilient levers.

* * * * *